United States Patent
Zeng

(10) Patent No.: US 11,841,602 B2
(45) Date of Patent: Dec. 12, 2023

(54) SOFT LIGHT BOX AND CHUCK ASSEMBLY THEREOF

(71) Applicant: GODOX PHOTO EQUIPMENT CO., LTD., Shenzhen (CN)

(72) Inventor: Weijun Zeng, Shenzhen (CN)

(73) Assignee: Godox Photo Equipment Co., Ltd., Shenzhen (CN)

(*) Notice: Subject to any disclaimer, the term of this patent is extended or adjusted under 35 U.S.C. 154(b) by 313 days.

(21) Appl. No.: 17/446,462

(22) Filed: Aug. 30, 2021

(65) Prior Publication Data

US 2021/0388942 A1    Dec. 16, 2021

Related U.S. Application Data

(63) Continuation of application No. PCT/CN2020/135764, filed on Dec. 11, 2020.

(30) Foreign Application Priority Data

Apr. 21, 2020 (CN) .......................... 202010317854.8

(51) Int. Cl.
*F16M 13/02* (2006.01)
*G03B 15/06* (2021.01)

(52) U.S. Cl.
CPC ............ *G03B 15/06* (2013.01); *F16M 13/02* (2013.01); *G03B 2215/0585* (2013.01); *G03B 2215/0592* (2013.01)

(58) Field of Classification Search
CPC .................................. G03B 15/06; F21V 1/06
See application file for complete search history.

(56) References Cited

U.S. PATENT DOCUMENTS 9,267,662 B2 * 2/2016 Portmann ............... G03B 15/06
9,298,064 B2 * 3/2016 Ortiz-Gavin ............. F21V 7/18

FOREIGN PATENT DOCUMENTS

| CN | 209640664 U | 11/2019 |
| CN | 209842309 U | 12/2019 |
| CN | 110709769 A | 1/2020 |
| CN | 210005840 U | 1/2020 |
| CN | 111474806 A | 7/2020 |
| CN | 211786537 U | 10/2020 |
| KR | 101706469 B1 | 2/2017 |
| WO | 2020045725 A1 | 9/2018 |

OTHER PUBLICATIONS

International Search Report for PCT/CN2020/135764 dated Mar. 16, 2021.

* cited by examiner

*Primary Examiner* — Leon W Rhodes, Jr.
(74) *Attorney, Agent, or Firm* — Rosenberg, Klein & Lee

(57) ABSTRACT

The present disclosure provides a soft light box and a chuck assembly thereof. The chuck assembly includes a chuck and a rotating plate. The chuck includes a carrying ring and a sleeve. The carrying ring is arranged on the outer side of the sleeve and used to carry a plurality of umbrella ribs hingedly connected with the carrying ring. The rotating plate is rotatably sleeved on the sleeve, rotates in a circumferential direction of the sleeve, and moves up and down along the axial direction of the sleeve. The up-down motion of the rotating plate presses the hinged ends of the umbrella ribs, and drives the umbrella ribs to swing relative to the carrying ring.

20 Claims, 18 Drawing Sheets

SOFT LIGHT BOX AND CHUCK ASSEMBLY THEREOF

CROSS-REFERENCE TO RELATED APPLICATIONS

This application is a continuation of PCT International Application No. PCT/CN2020/135764, filed on Dec. 11, 2020, now abandoned, which claims priority to China Application No. 202010317854.8 filed on Apr. 21, 2020.

TECHNICAL FIELD

The present disclosure relates to photographing equipment, and more particularly to a soft light box and a chuck assembly thereof.

BACKGROUND

The soft light box is installed on the studio lamp and emits soft light to eliminate the light spots and shadows on the photo when photographing. For most soft light boxes, soft light cloths are support by foldable umbrella ribs to form a reflective surface of the soft light box.

When the reflective surface of the soft light box is larger, the light is more uniform and softer, and the colors are more vivid. In order to achieve a better photographing effect, the reflective area of the soft light box is required to be larger and larger. However, for a large soft light box, the length of the umbrella ribs is too long, and it is difficult to store and open the umbrella ribs, and the operation is inconvenient.

SUMMARY

There are provided a soft light box and a chuck assembly thereof according to embodiments of the present disclosure. The technical solution is as below:

According to a first aspect of embodiments of the present disclosure, there is provided a chuck assembly of a soft light box, comprising:

a chuck, comprising a carrying ring and a sleeve, wherein the carrying ring is arranged on an outer side of the sleeve and is used to carry a plurality of umbrella ribs hingedly connected to the carrying ring; and a rotating plate, rotatably sleeved on the sleeve, wherein the rotating plate rotates in a circumferential direction of the sleeve and moves up and down along an axial direction of the sleeve;

wherein the rotating plate presses hinged ends of the umbrella ribs through up and down motion, and the up and down motion of the rotating plate drives the umbrella ribs to swing relative to the carrying ring.

According to a second aspect of embodiments of the present disclosure, there is provided a soft light box, comprises umbrella ribs, a soft light cloth and a chuck assembly. The chuck assembly of a soft light box comprising a chuck and a rotating plate. The chuck comprises a carrying ring and a sleeve. The carrying ring is arranged on an outer side of the sleeve and is used to carry a plurality of umbrella ribs hingedly connected to the carrying ring. The rotating plate is rotatably sleeved on the sleeve, rotates in a circumferential direction of the sleeve and moves up and down along an axial direction of the sleeve. The rotating plate presses hinged ends of the umbrella ribs through up and down motion, and the up and down motion of the rotating plate drives the umbrella ribs to swing relative to the carrying ring. The soft light cloth is detachably arranged on the umbrella ribs, and one end of each the umbrella rib is hinged on the carrying ring.

DETAILED DESCRIPTION

Figure 1:
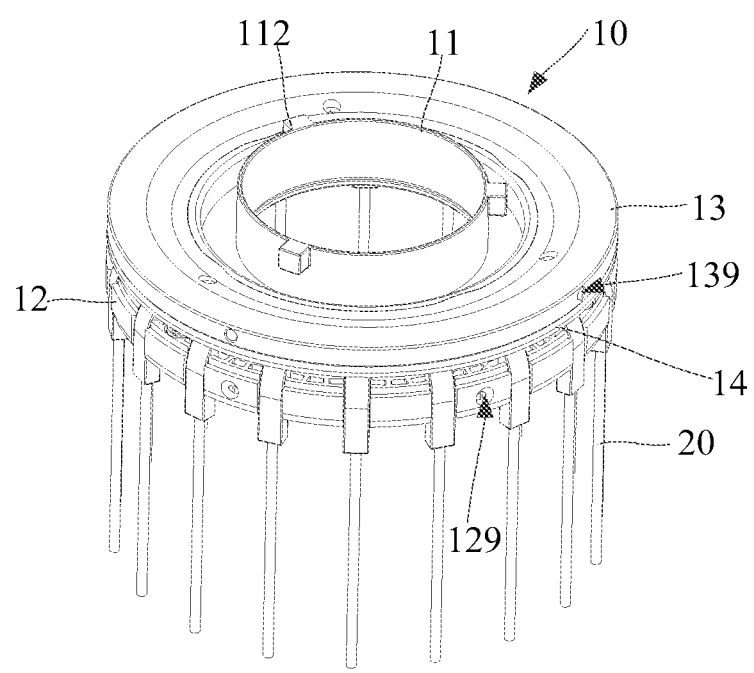
FIG. 1 is a perspective view of a chuck assembly of a soft light box of the embodiment.

Exemplary embodiments will now be described more fully with reference to the accompanying drawings. However, the exemplary embodiments can be implemented in various forms, and should not be construed as being limited to the examples set forth herein; on the contrary, these embodiments are provided for making the present disclosure more comprehensive and complete, and fully conveying the concept of the exemplary embodiments to those skilled in the art. The drawings are only schematic illustrations of the present disclosure, and are not necessarily drawn to scale. The same reference numerals in the drawings denote the same or similar parts, and thus their repeated description will be omitted.

In addition, the described features, structures, or characteristics can be combined in one or more embodiments in any suitable manner. In the following description, many specific details are provided to give a sufficient understanding of the embodiments of the present disclosure. However, those skilled in the art will realize that the technical solutions of the present disclosure can be practiced without one or more of the specific details, or other methods, components, devices and steps can be used. In other cases, well-known structures, methods, devices, implementations, materials, or operations are not shown or described in detail in order to avoid distracting others and obscure all aspects of the present disclosure.

In the description of the present disclosure, unless otherwise clearly stipulated and limited, the terms "mount", "connect", "joint" and "fix" should be understood in a broad sense, for example, it can be a fixed connection, a detachable connection, or an integral connection. Or it can be a mechanical connection, an electrical connection or can be communicated with each other. Or it can be a direct connection, or an indirect connection through an intermediate medium, and it can be an internal communication between two elements or the interaction relationship between two elements. For those of ordinary skill in the art, the specific meaning of the above-mentioned terms in the present disclosure can be understood according to specific circumstances.

In addition, the terms "first" and "second" are only used for descriptive purposes, and cannot be understood as indicating or implying relative importance or implicitly indicating the number of indicated technical features. Thus, the features defined with "first" and "second" may explicitly or implicitly include one or more of these features. In the description of the present disclosure, "plurality" means at least two, such as two, three, etc., unless otherwise specifically defined.

Hereinafter, the embodiments of the present disclosure will be further described in detail in conjunction with the accompanying drawings of this specification.

The present disclosure proposes a soft light box and chuck assembly thereof. The chuck assembly is used to fix the camera device (not shown in the figures) to the soft light box to facilitate the shooting of the camera device.

Figure 2:
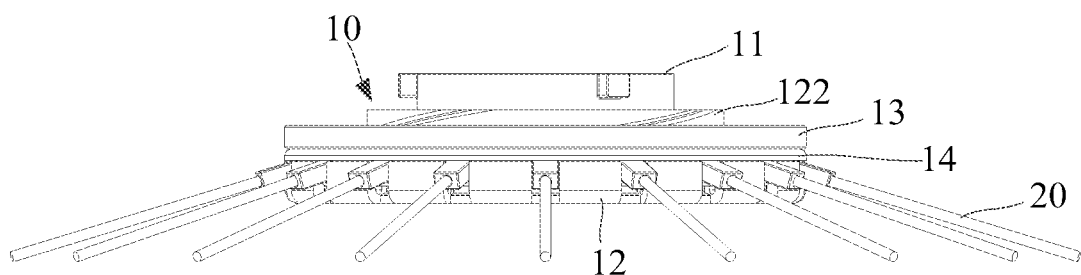
FIG. 2 is a schematic structural view of the chuck assembly shown in FIG. 1 in another state.

Referring to FIG. 1 and FIG. 2, specifically, in the embodiment, the soft light box includes a chuck assembly 10, umbrella ribs 20 and a soft light cloth (not shown in the FIG. 1 or FIG. 2). The soft light cloth can be detachably arranged on the umbrella ribs 20. One end of each umbrella ribs 20 is hinged on the chuck assembly 10. The umbrella ribs 20 can be opened and folded in an umbrella shape relative to the chuck assembly 10 to realize the opening and closing of the soft light box. FIG. 1 is a view of the umbrella ribs 20 in a folded state, and FIG. 2 is a view of the umbrella ribs 20 in an open state.

Figure 3:
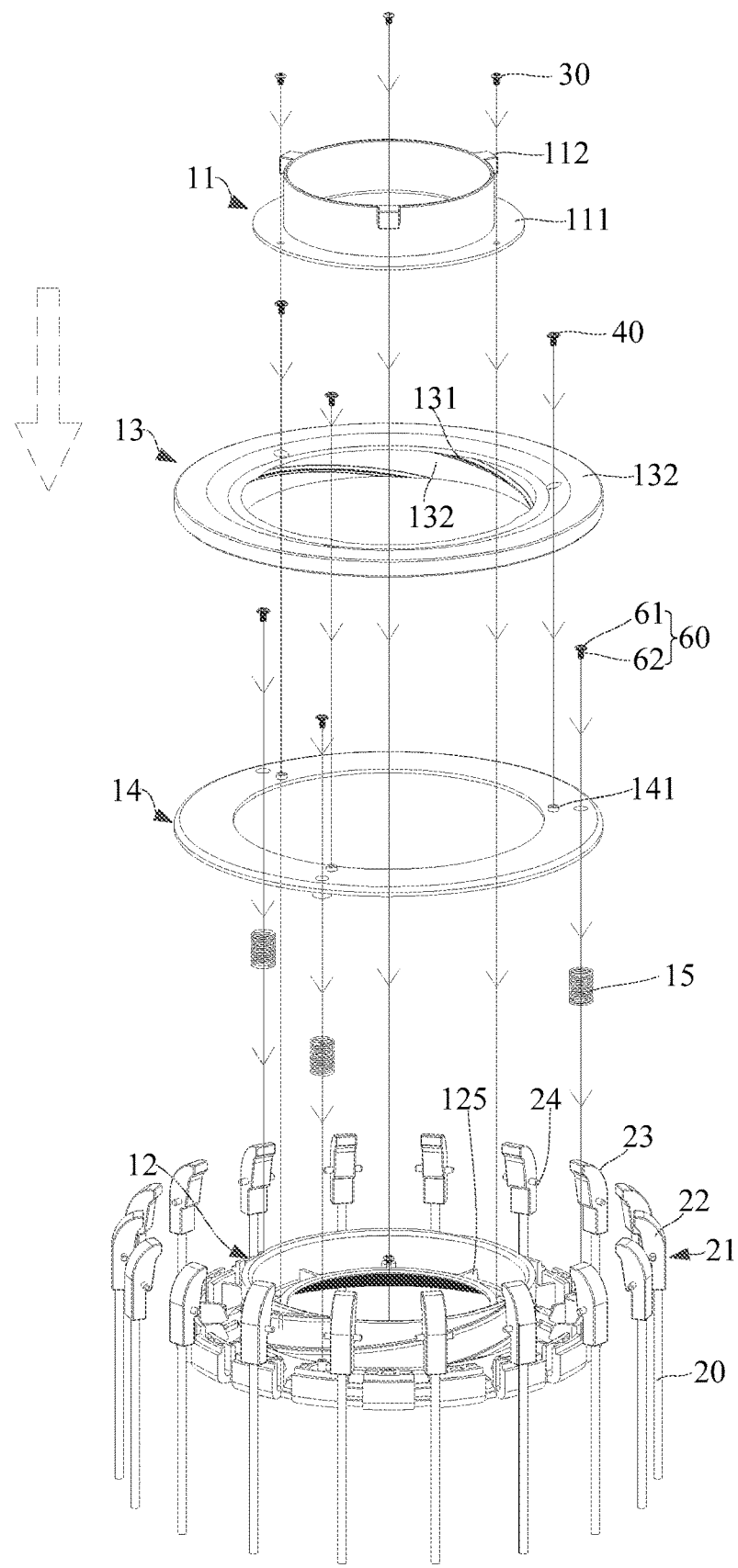
FIG. 3 is an exploded view of the chuck assembly shown in FIG. 1.

Referring to FIG. 3 at the same time, the chuck assembly 10 includes a bayonet 11, a chuck 12 and a rotating plate 13. Both the bayonet 11 and the rotating plate 13 are arranged on the chuck 12. The bayonet 11 is used to connect a camera device or a light source. The rotating plate 13 rotates relative to the chuck 12 to drive the umbrella ribs 20 to open and fold.

Each umbrella rib 20 is a long and narrow support rod for supporting the soft light cloth. The end of each umbrella rib 20 close to the chuck 12 is a hinged end 21. The hinged end 21 is provided with a hinged sleeve 22. An outer side of the hinged sleeve 22 is provided with an arc-shaped pressing surface 23. The surface of the pressing surface 23 is an arc-shaped surface. The arc-shaped surface helps to press the hinged end 21 to drive the umbrella ribs 20 to move. A pivot shaft 24 is provided on opposite sides of the hinged sleeve 22. The hinged end 21 rotates around the pivot shaft 24 as an axis.

Figure 4:
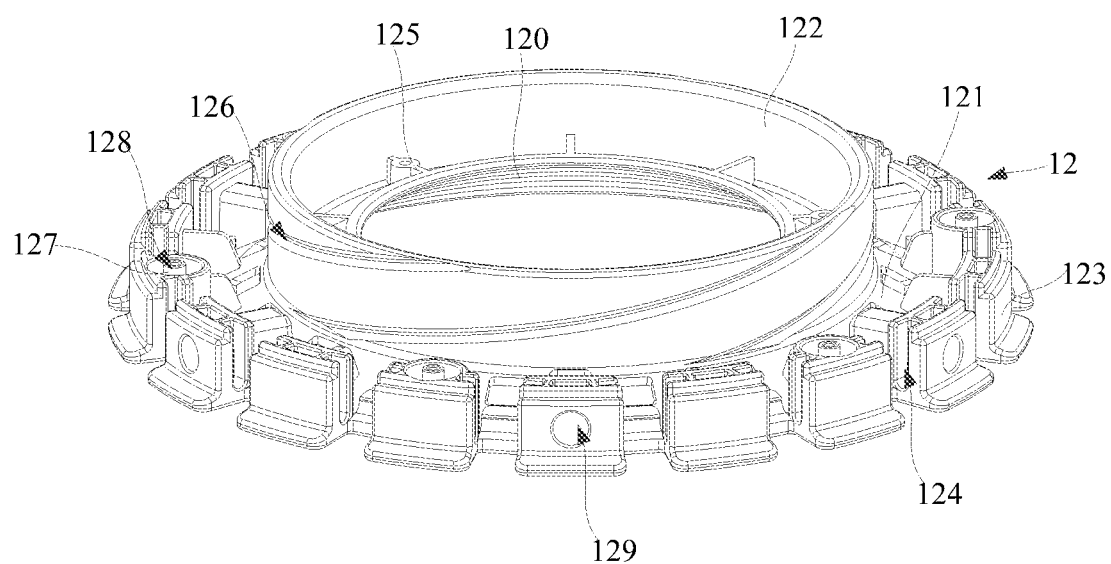
FIG. 4 is a perspective view of the chuck shown in FIG. 3 from another angle.

Referring to FIG. 4 at the same time, the chuck 12 includes a carrying ring 121 and a sleeve 122. The carrying ring 121 is provided on the outside of the sleeve 122. The chuck 12 may be an injection molded part. The carrying ring 121 and the sleeve 122 may be integrally formed. The central axis of the sleeve 122 is an optical axis direction of the camera device.

A diffuse reflection layer 120 is provided on a side of the carrying ring 121 facing away from the rotating plate 13. The diffuse reflection layer 120 can diffusely reflect the light of the light source to ensure that the light in the soft light box is soft. The diffuse reflection layer 120 is provided with a texture that can form diffuse reflection. Specifically, in the embodiment, the texture may be a stepped texture.

The carrying ring 121 is used to carry the plurality of umbrella ribs 20 hingedly connected thereto. The carrying ring 121 is provided with a supporting surface. The hinged portions 123 for hingedly connecting the umbrella ribs 20 are arranged on the supporting surface. The hinged portions 123 protrude from the annular supporting surface. In addition, the hinged portions 123 are evenly distributed along a circumferential direction of the annular supporting surface. Specifically, the hinged portions 123 are provided with a shaft groove 124 for receiving the pivot shaft 24 of the umbrella ribs 20. The pivot shafts 24 can be respectively received in the shaft grooves 124 of the hinged portions 123 and form a hinge connection with the hinged portions 123.

In addition, the hinged portions 123 have a certain height, and the shaft grooves 124 also have a certain height. When the pivot shafts 24 of the umbrella ribs 20 rotate in the shaft grooves 124, the pivot shafts 24 also move up and down along the extending direction of the shaft groove 124. On the one hand, it can facilitate the swing of the umbrella ribs 20 with respect to the carrying ring 121. On the other hand, when the umbrella ribs 20 are fully opened, the outer surface of the hinged end 21 of the umbrella ribs 20 can resist against the supporting surface to ensure that the umbrella ribs 20 can be stably opened.

Figure 5:
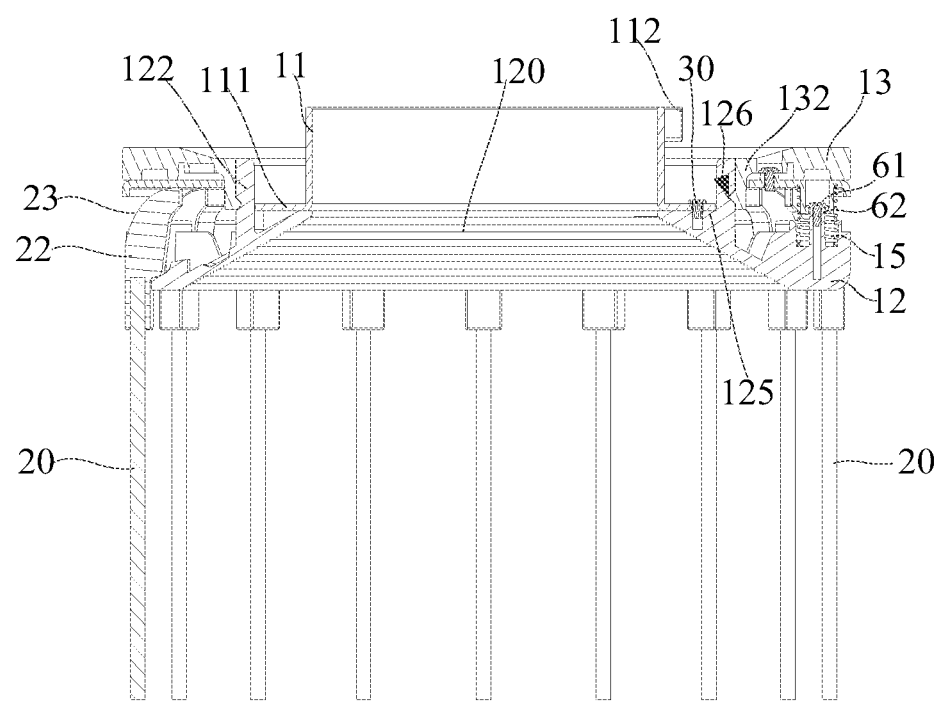
FIG. 5 is a cross-sectional view of the chuck assembly shown in FIG. 1.

The sleeve 122 is provided on an inner side of the carrying ring 121. A step portion 125 is provided on an inner side of the sleeve 122. The step portion 125 is provided for connecting to the bayonet 11. Specifically, the bayonet 11 is provided with a protruding edge 111. Referring to FIG. 5, the protruding edge 111 can be fixedly connected to the step portion 125 by the screw 30 to realize a detachable connection between the bayonet 11 and the chuck 12. When the type of bayonet 11 needs to be replaced, the screw 30 needs to be removed. In other embodiments, the bayonet 11 can also be detachably connected to the chuck 12 through a snap connection.

Referring to FIG. 3 again, specifically, in the embodiment, the bayonet 11 is provided with a plurality of protrusions 112 on the outer side for the snap connection of the camera device. The protrusions 112 can realize the position-limiting connection between the bayonet 11 and the camera device. It can be understood that when the bayonet 11 is a different type of bayonet, the protrusions 112 can also be omitted. The bayonet 11 can also be connected to the camera device in a position-limiting manner through other corresponding types of structures.

Referring to FIG. 4 again, an outer side of the sleeve 122 is provided with a first rotating thread 126. The direction of the rotating thread is forward. Specifically, the first rotating thread 126 is a thread groove. In addition, the sleeve 122 is provided with a first rotating thread 126 whose height is greater than that of the umbrella ribs 20 from fully opened to fully folded, and the pivot shafts 24 of the umbrella ribs 20 move up and down along the shaft grooves 124.

Figure 6:
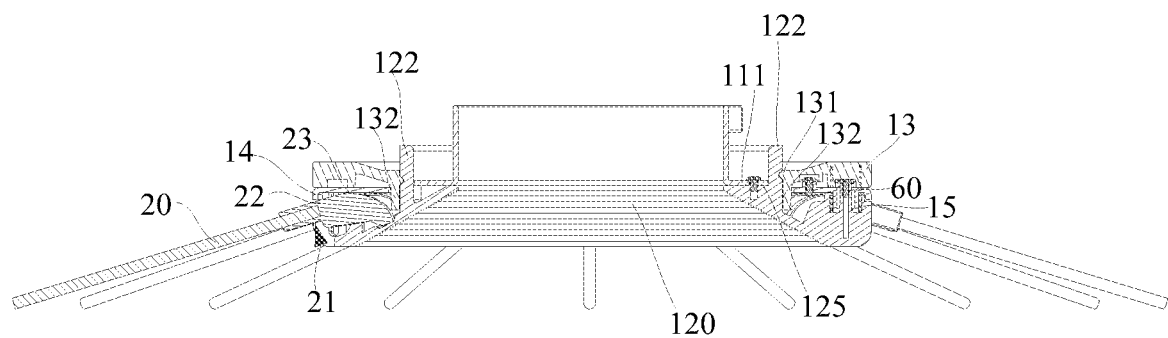
FIG. 6 is a cross-sectional view of the chuck assembly shown in FIG. 2.

Referring to FIG. 5 and FIG. 6 at the same time, the rotating plate 13 can be rotatably sleeved on the sleeve 122. The rotating plate 13 rotates in the circumferential direction of the sleeve 122, and the rotating plate 13 moves up and down along the axial direction of the sleeve 122. The inner side of the rotating plate 13 is provided with a second rotating thread 131 engaging with the first rotating thread 126 of the sleeve 122. In addition, the second rotating thread 131 is a thread protrusion. The thread protrusion and the thread groove realize a rotary connection. It can be understood that the first rotating thread 126 may also be a thread protrusion, and the second rotating thread 131 is correspondingly a thread groove. The specific shapes of the first rotating thread 126 and the second rotating thread 131 are not limited herein, as long as the first rotating thread 126 and the second rotating thread 131 can be engaged and connected.

Specifically, an extension portion 132 is provided on the inner side of the rotating plate 13, and the extension portion 132 extends upward or downward along an axial direction of the rotating plate 13. The extension portion is provided with a second rotating thread 131. The extension portion 132 can increase the contact area between the rotating plate 13 and the sleeve 122 to facilitate the rotation of the rotating plate 13. In addition, the extension portion 132 can presses on the pressing surface 23.

When the rotating plate 13 rotates relative to the sleeve 122, the rotating plate 13 can rotate along the tracks of the first rotating thread 126 and the second rotating thread 131. When the rotating plate 13 rotates relative to the sleeve, the rotating plate 13 moves up and down in the axial direction of the sleeve 122 due to the guiding effect of the rotating thread. The up-down movement of the rotating plate 13 presses the hinged end 21 of the umbrella ribs 20.

When the rotating plate 13 moves towards the chuck 12, the hinged end 21 receives downward pressure, the pivot shafts 24 rotate and move downward along the shaft groove 124, and the other end of the umbrella ribs 20 opens, thereby stretching the soft light cloth. When the rotating plate 13 moves away from the chuck 12, the hinged end 21 is no longer under pressure, and the umbrella ribs 20 can be reset and folded.

Referring to FIG. 3 again, the chuck assembly 10 of the soft light box in the embodiment further includes a fixing press plate 14. The fixing press plate 14 is sleeved between the carrying ring 121 and the rotating plate 13. The fixing press plate 14 is rotatably arranged on the rotating plate 13. The rotating plate 13 presses the fixing press plate 14, and drives the fixing press plate 14 to press the hinged end 21 of the umbrella ribs 20.

During the rotation of the rotating plate 13, since the rotating plate 13 rotates relative to the umbrella ribs 20, there is friction between the rotating plate 13 and the hinged end 21 of the umbrella ribs 20. In addition, the rotating plate 13 needs a relatively large pressure to press the umbrella ribs 20, and the friction between the rotating plate 13 and the umbrella ribs 20 is also relatively large. The friction has a relatively large hindrance to the rotation of the rotating plate 13. Moreover, the plurality of umbrella ribs 20 are arranged at intervals, and the force of the rotating plate 13 is uneven, which is not conducive to a smooth rotation of the rotating plate 13.

The rotating plate 13 is rotatably connected to the fixing press plate 14, and the fixing press plate 14 does not rotate relative to the umbrella ribs 20. There is friction between the rotation of the rotating plate 13 and the fixing press plate 14. Since the surface of the fixing press plate 14 is smooth and the pressure between the rotating plate 13 and the fixing press plate 14 is evenly distributed, the friction between the rotating plate 13 and the fixing press plate 14 is relatively small. Therefore, the fixing press plate 14 can prevent the rotating plate 13 from being subjected to greater frictional resistance, and the rotating plate 13 can rotate smoothly.

Figure 7:
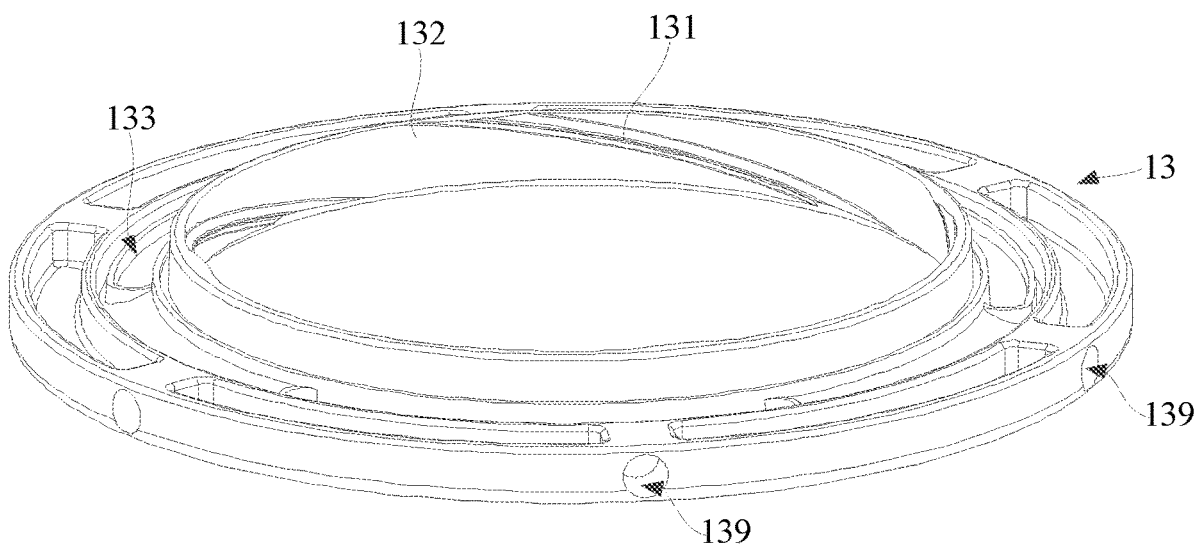
FIG. 7 is a perspective view of a rotating plate shown in FIG. 3 from another angle.

Limit structures are further provided between the rotating plate 13 and the fixing press plate 14. The limit structures are fixed on the fixing press plate 14. Referring to FIG. 7 at the same time, the side of the rotating plate 13 facing the fixing press plate 14 is provided with avoiding grooves 133 for avoiding the limit structure. The rotating plate 13 rotates, and the limit structure slides in the avoiding groove 133. When the limit structure moves to one end of the avoiding groove 133, the limit structure abuts against a side wall of the avoiding groove 133 to limit the rotation of the rotating plate 13. Therefore, the limit structure can prevent the rotating plate 13 from rotating beyond predetermined stroke, preventing the rotating plate 13 from falling off the sleeve 122, or excessively squeezing the abutting end of the umbrella ribs 20.

Specifically, in the embodiment, referring to FIG. 3 at the same time, the limit structure may be a screw 40. The screw 40 passes through the rotating plate 13 and is fixed on the fixing press plate 14. Correspondingly, the rotating plate 13 is provided with a through hole (not shown in the figures). The through hole is used to pass the screw 40 to facilitate the mounting of the screw 40. The fixing press plate 14 is correspondingly provided with a screw hole 141 for fixing the screw 40. The screw 40 is fixed on the fixing press plate 14 and protrudes from the surface of the fixing press plate 14. The nut of the screw 40 can extend into the avoiding groove 133.

The avoidance groove 133 is arc-shaped, whose radian corresponds to the rotation stroke of the rotating plate 13. When the nut of the screw contacts and resists the inner side wall of the avoiding groove 133 to limit the position, the rotating plate 13 cannot continue to rotate, thereby achieving the purpose of limiting the rotating plate 13.

Specifically, the radian of the avoiding groove 133 is 60 degrees to 120 degrees. That is, the rotation stroke of the rotating plate 13 is 60 degrees to 120 degrees. Within the range of the rotation stroke, it is convenient for the operator to rotate, it avoids the excessive rotation stroke, and it does not need the operator to turn around the soft light box. At the same time, it can also avoid the rotation stroke being too small, and avoid rotation difficulty caused by the rotation resistance of the rotating plate 13 being too large.

Referring to FIG. 5 and FIG. 6, the chuck assembly 10 of the soft light box in the embodiment further includes a resilient member 15. The resilient member 15 abuts between the fixing press plate 14 and the carrying ring 121 of the chuck 12. The fixing press plate 14 goes down and presses the resilient member 15 to compress. When the resilient member 15 returns to the original shape, the fixing press plate 14 restores to the original position.

When the rotating plate 13 and the fixing press plate 14 press the hinged end 21 of the umbrella ribs 20 downward, the resilient member 15 is compressed along with the downward movement of the fixing press plate 14. Since the resilient member 15 is compressed and has elastic potential energy, when the rotating plate 13 rotates in the reverse direction and the pressing effect on the umbrella ribs 20 is released, the resilient member 15 restores to stretch and rebounds to the original position. Then the fixing press plate 14 is pushed up by the resilient member 15 and returns to the initial position. The above-mentioned chuck assembly 10 can automatically reset the fixing press plate 14 through the resilient member 15 to prevent the fixing press plate 14 from shaking between the rotating plate 13 and the carrying ring 121 of the chuck, which affects the stability of the chuck assembly 10.

Figure 8:
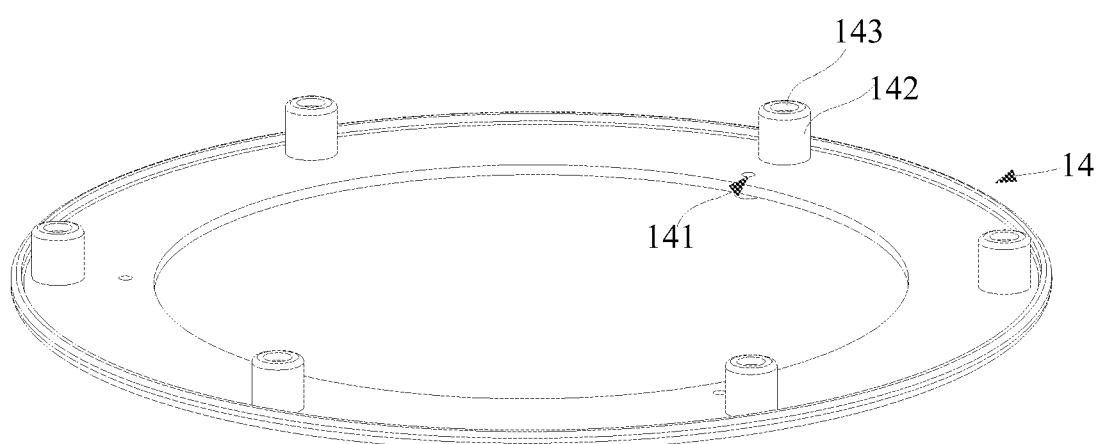
FIG. 8 is a perspective view of a fixing press plate shown in FIG. 3.

Referring to FIG. 4, specifically, in the embodiment, protruding columns 127 are provided on the carrying ring 121. The protruding column 127 is provided with a screw hole 128. Referring to FIG. 8, a sink groove 142 is protruded toward the protruding column 127 at the relative position of the fixing press plate 14 and the protruding column 127. The bottom of the sink groove 142 is provided with a through hole 143 for the protrusion 127 to pass through. Referring to FIG. 5 and FIG. 6, when the fixing press plate 14 moves up and down relative to the carrying ring 121, the protruding column 127 stretches out and draws back along the through hole 143. The protruding column 127 and the sink groove 142 are screwed together by a screw 60. The nut 61 of the screw 60 is limited in the sink groove 142. That is, the aperture size of the through hole 143 is smaller than the diameter of the nut 61, but the aperture size of the through hole 143 is larger than the diameter of the stud 62 to ensure that the stud 62 of the screw 60 can pass through the through hole 143, and the nut 61 is limited to the sink groove 142.

When the fixing press plate 14 is far away from the carrying ring 121, the nut 61 of the screw 60 abuts against the side wall at the bottom of the through hole 143 to prevent the nut 61 from detaching from the sink groove 142, causing the fixing press plate 14 and the carrying ring 121 to separate from each other.

The resilient member 15 is sleeved on the outside of the protruding column 127 and the sinking groove 142. The protruding post 127 and the sinking groove 142 can guide and limit the expansion and compression of the resilient member 15 to prevent the resilient member 15 from shifting during the expansion and compression process. The resilient member 15 may be a spring.

Figure 9:
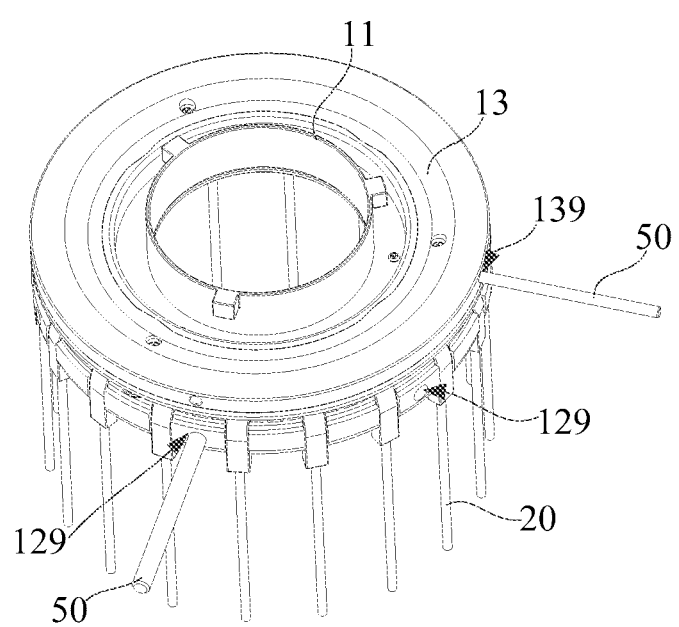
FIG. 9 is a schematic diagram of a rotation process of the chuck assembly shown in FIG. 1.

Referring to FIG. 9, the outer side of the chuck 12 and the outer side of the rotating plate 13 are respectively provided with the auxiliary holes 129 and 139. The auxiliary holes 129 and 139 can be inserted into the auxiliary rotating pin 50, and the auxiliary rotating pin 50 can be conveniently held by the operator. In addition, the chuck 12 and the rotating plate 13 are respectively provided with the auxiliary holes 129 and 139, and the two auxiliary holes 129 and 139 are respectively provided with the auxiliary rotating pin 50. When the operator's two hands respectively hold one auxiliary rotating pin 50 and apply force at the same time to increase the torque of the rotating force, it is convenient to rotate the rotating plate 13 and the chuck 12 relative to each other.

In addition, there may be multiple auxiliary holes 129 and 139 respectively. The operator can choose according to the convenience of use, and select two of the auxiliary holes 129 and 139 with a convenient operating distance for operation. Therefore, the auxiliary holes 129 and 139 enhance the convenience of operation, which are more user-friendly.

After the rotation is completed, the auxiliary rotation pins 50 can be removed from the auxiliary holes 129 and 139 without affecting the size and normal use of the chuck assembly 10.

The chuck assembly 10 of the soft light box can allow the operator to open the umbrella ribs 20 without great strength, and the umbrella ribs 20 can be opened by rotating the rotating plate 13. In addition, when the umbrella ribs 20 are folded, the rotating plate 13 rotates in the reverse direction to release the pressing limit of the umbrella ribs 20, thereby folding the umbrella ribs 20. Therefore, the chuck assembly 10 of the soft light box can be operated by the operator without great strength, which is convenient to operate, and improves the convenience of using the soft light box.

Figure 10:
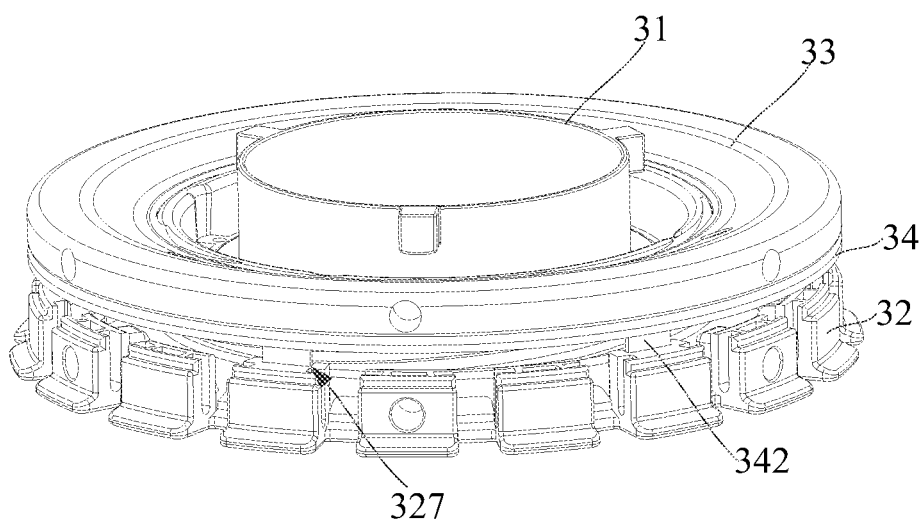
FIG. 10 is a perspective view of the chuck assembly of the soft light box according to another embodiment.
Figure 11:
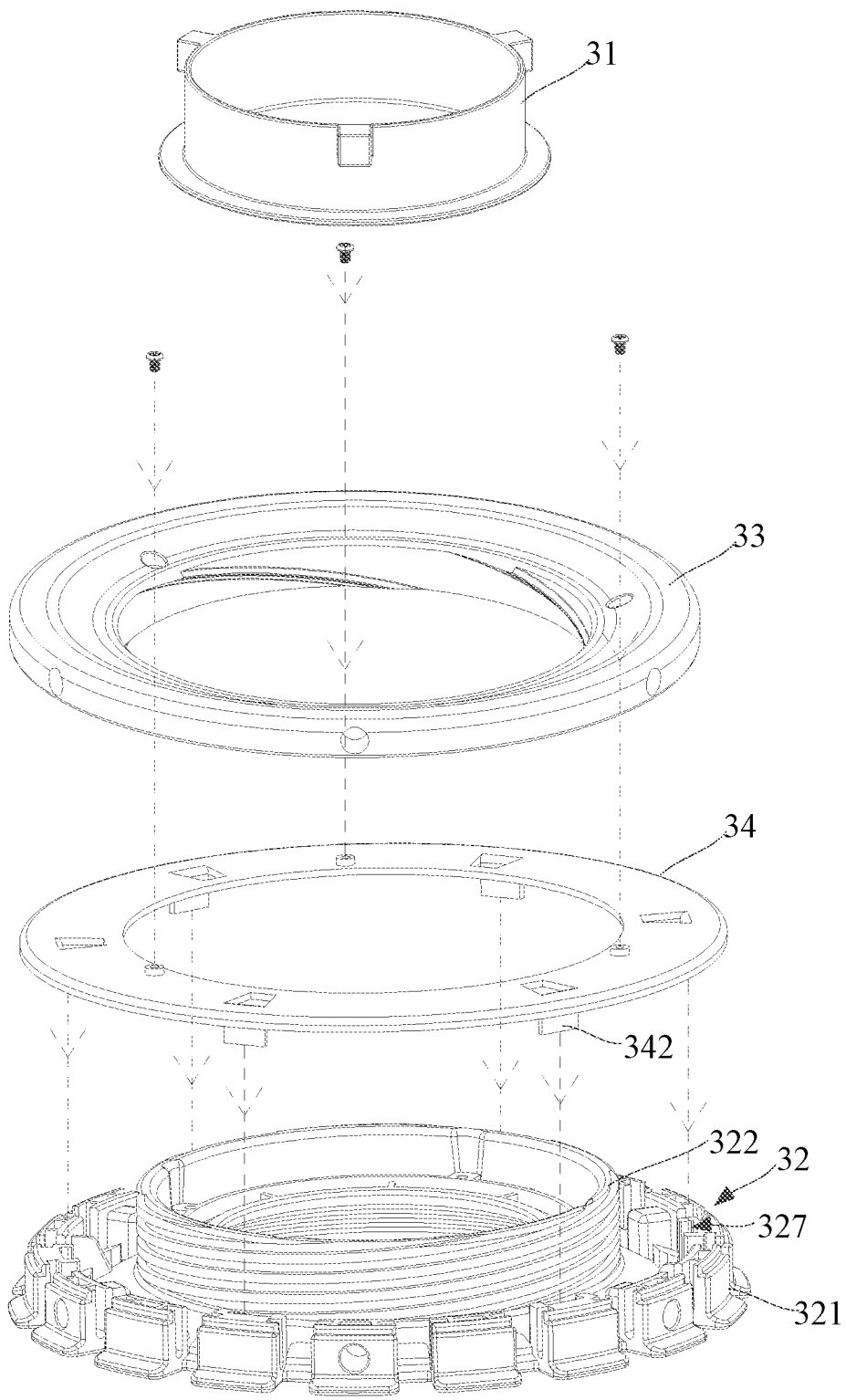
FIG. 11 is an exploded view of the chuck assembly shown in FIG. 10.

In other embodiments, the resilient member 15 can further be omitted. The structure of the chuck assembly of the soft light box can also be as shown in FIG. 10 and FIG. 11. Both the bayonet 31 and the rotating plate 33 are provided on the chuck 32. The bayonet 31 is used to connect a camera device or a light source. The rotating plate 33 rotates relative to the chuck 32 to drive the umbrella ribs 20 to open and fold.

Figure 12:
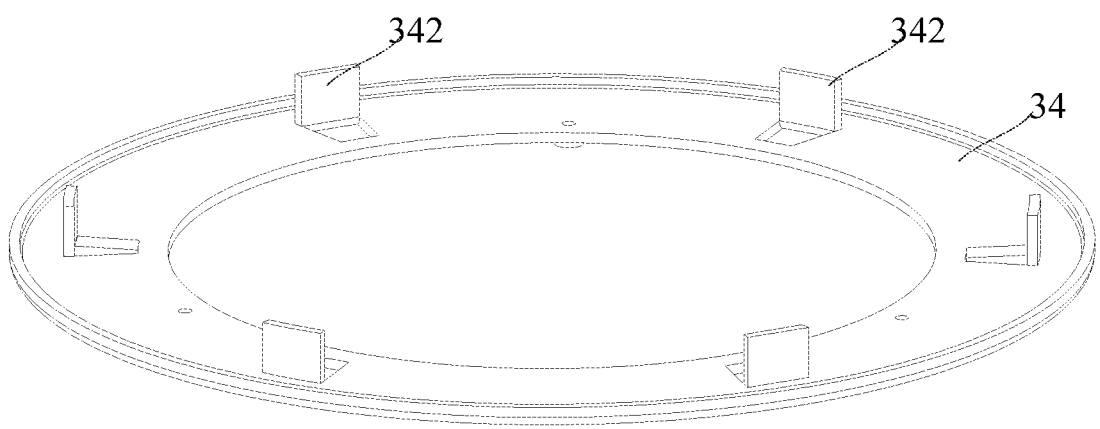
FIG. 12 is a perspective view of the fixing press plate shown in FIG. 11 from another angle.

Referring to FIG. 12 at the same time, a guide plate 342 is provided on the fixing press plate 34. The guide plate 342 is bent and protruded toward the carrying ring 321. In addition, the plane where the guide plate 342 is located is perpendicular to the plane where the fixing press plate 34 is located. Specifically, there are multiple guide plates 342 evenly distributed on the side surface of the fixing press plate 34 facing the carrying ring 321. The guide plates 342 can be formed by punching, pressing and bending. The guide plates 342 and the fixing press plate 34 are an integral structure. Therefore, the structure is simple and the manufacturing is convenient.

Referring to FIG. 11 at the same time. Correspondingly, guide grooves 327 are provided on the carrying ring 321. The guide plate 342 is correspondingly received in the guide groove 327. In addition, one side surface of the guide plate 342 abuts against the inner side wall of the guide groove 327. In addition, the shape of the guide plate 342 matches the shape of the guide groove 327. When the guide groove 327 is an arc-shaped groove, correspondingly, the cross section of the guide plate 342 is also an arc-shaped plate.

Figure 13:
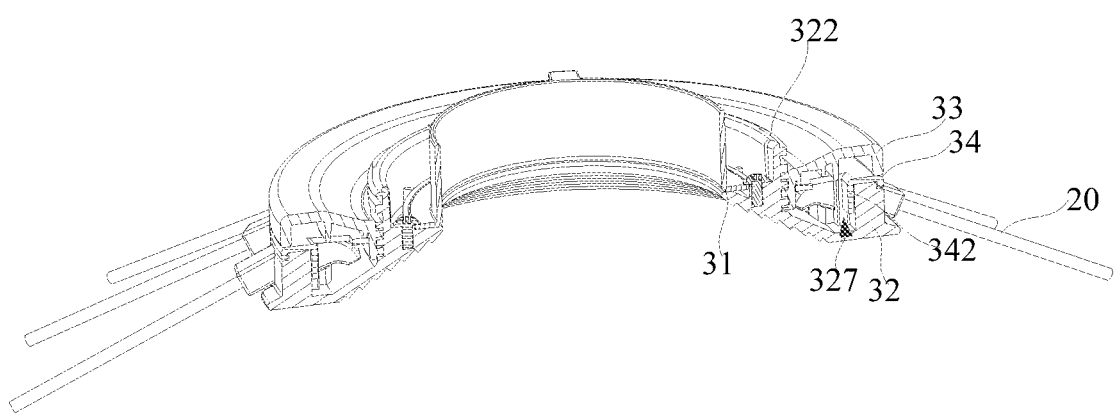
FIG. 13 is a perspective cross-sectional view of the chuck assembly shown in FIG. 10 in a state.
Figure 14:
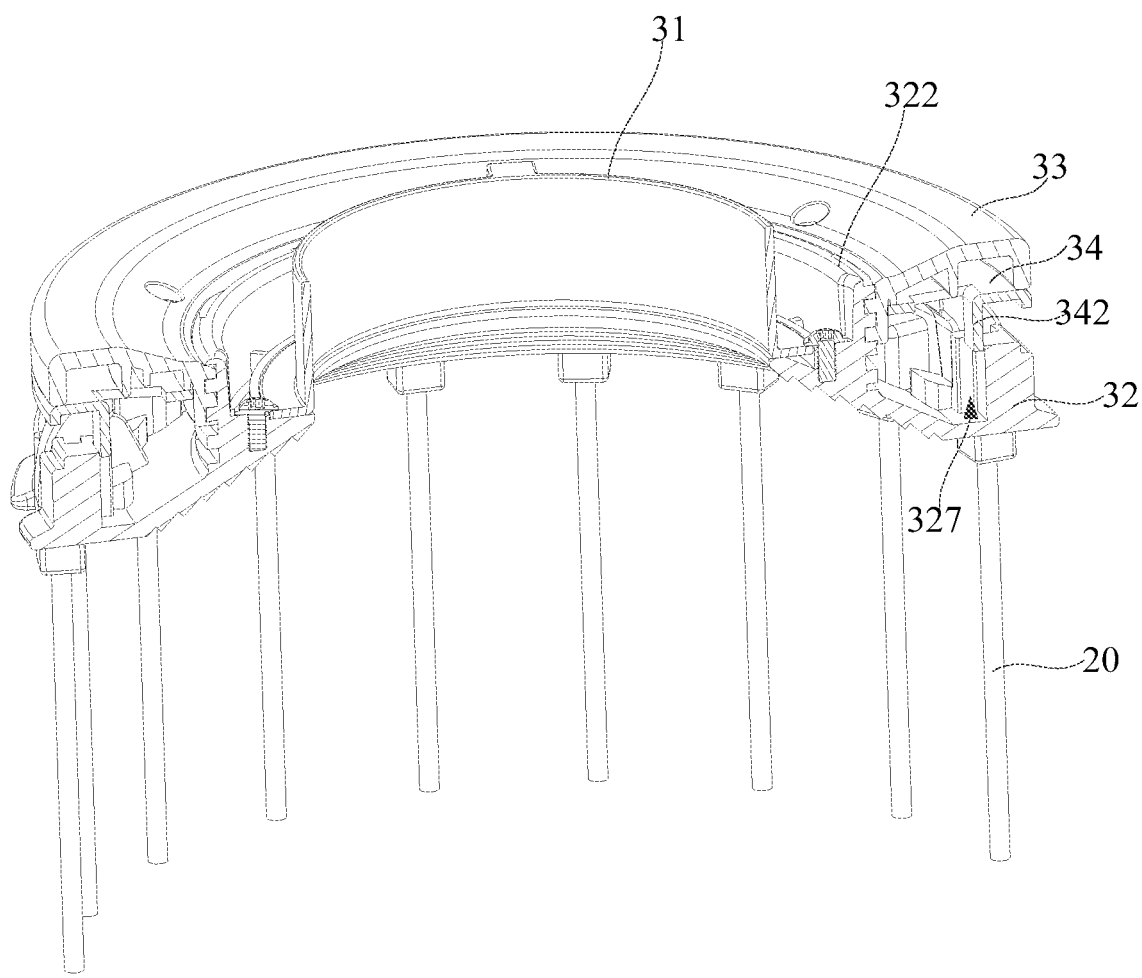
FIG. 14 is a perspective cross-sectional view of the chuck assembly shown in FIG. 13 in another state.

In addition, the guide plate 342 slides along the guide groove 327. The edge of the guide plate 342 is rounded to facilitate the guide plate 342 to slide along the guide groove 327. Referring to FIG. 13 and FIG. 14, when the fixing press plate 14 moves up and down relative to the carrying ring 121, the guide plate 342 slides along the guide groove 327. Then, the cooperation of the guide plate 342 and the guide groove 327 can guide the relative movement between the fixing press plate and the carrying ring. In addition, the structure of the fixing press plate 34 and the carrying ring 321 is simple and easy to implement.

Figure 15:
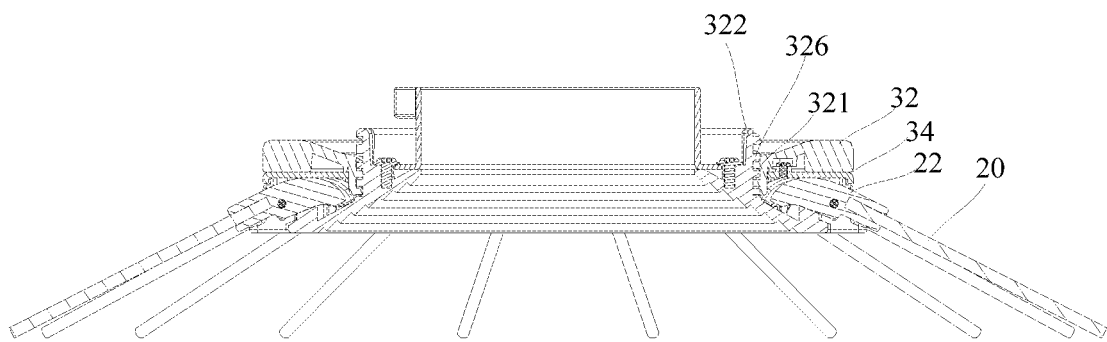
FIG. 15 is a cross-sectional view of the chuck assembly shown in FIG. 13.
Figure 16:
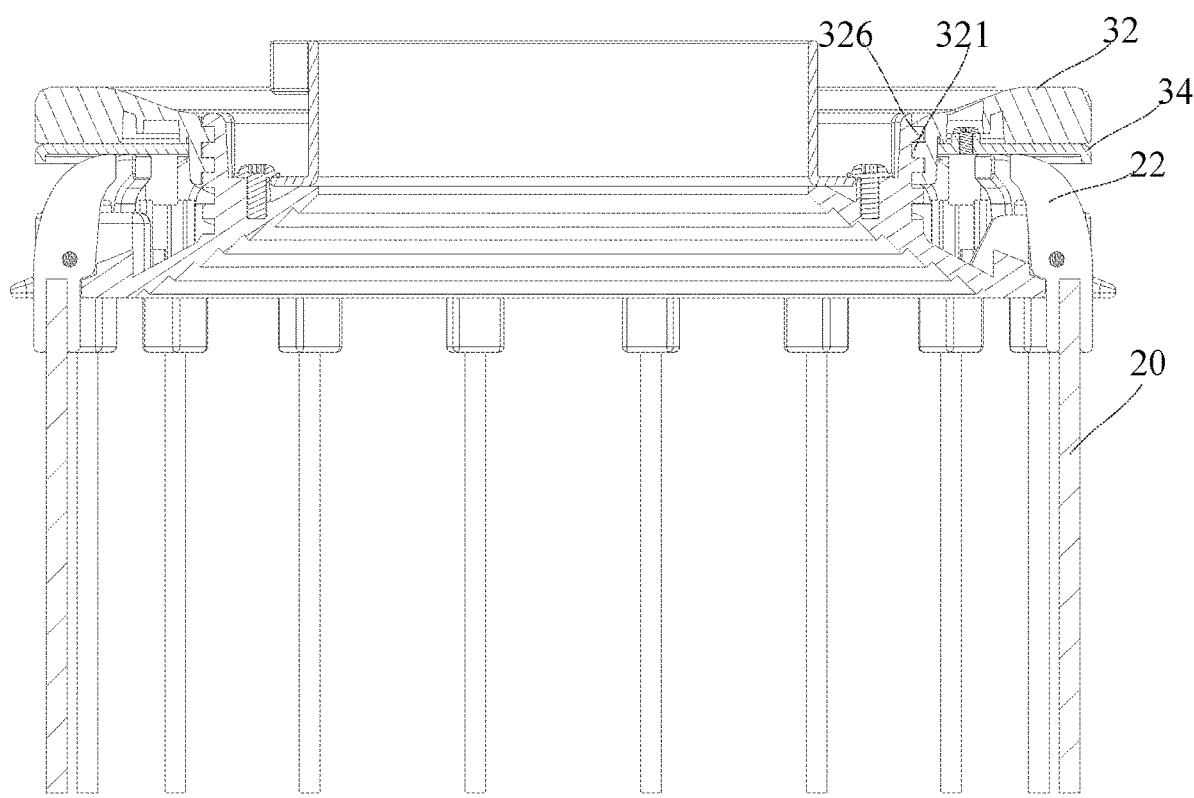
FIG. 16 is a cross-sectional view of the chuck assembly shown in FIG. 14.

In addition, referring to FIG. 15 and FIG. 16, in other embodiments, the sleeve 322 of the chuck 32 may also be provided with a first rotating thread 326 that is continuously encircling multiple times. Then, the inner side of the rotating plate 33 may also be provided with a second rotating thread 321 that is continuously encircling multiple times. The multi-round first rotating thread 326 and the multi-round second rotating thread 321 engage with each other to rotate, so that the rotating plate 13 can stably rotate along the circumferential direction of the sleeve 122.

Figure 17:
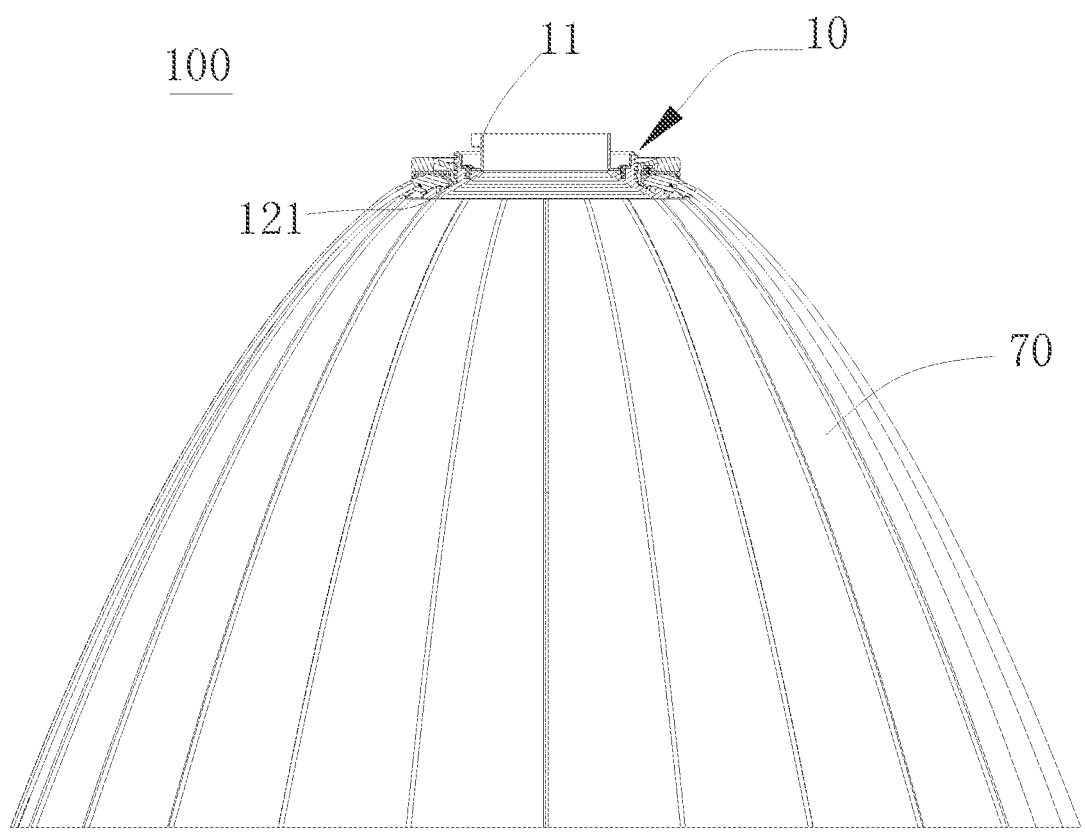
FIG. 17 is a view of a soft light box with umbrella ribs in an open state.
Figure 18:
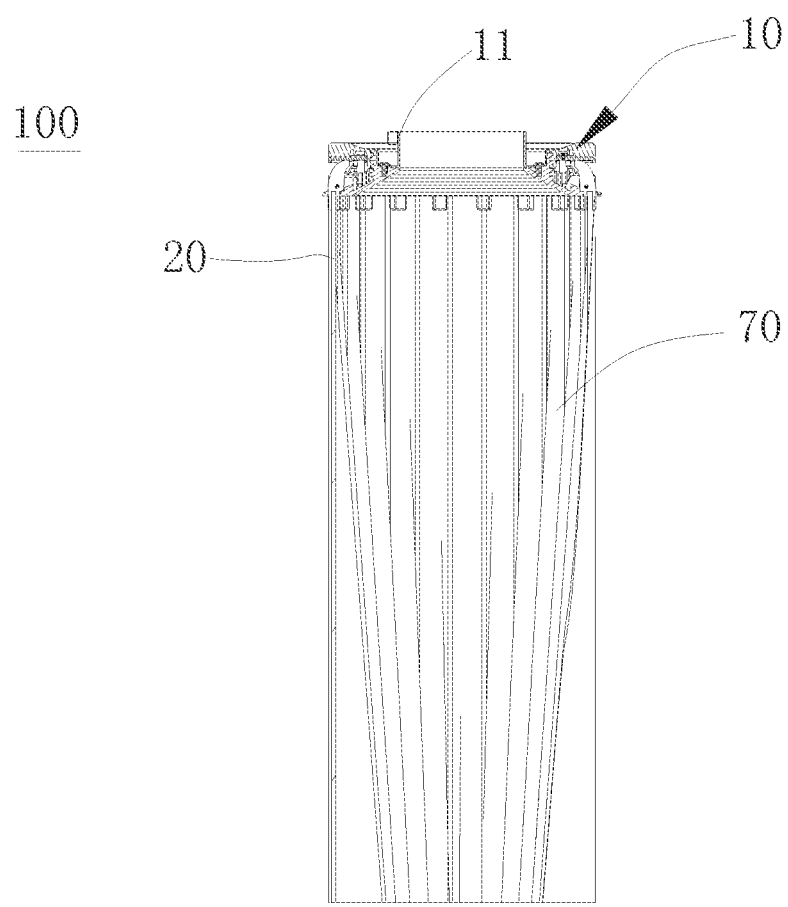
FIG. 18 is a view of a soft light box with umbrella ribs in a folded state.

Referring to FIG. 17 and FIG. 18, the present disclosure also provides a soft light box 100, which includes a chuck assembly 10, umbrella ribs 20 and a soft light cloth 70. the soft light cloth 70 is detachably arranged on the umbrella ribs 20, and one end of each the umbrella rib 20 is hinged on the carrying ring 121 of the chuck assembly 10. The bayonet 11 is used to connect a camera.

Although the present disclosure has been described with reference to a few typical embodiments, it should be understood that the terms used are illustrative and exemplary rather than restrictive. Since the present disclosure can be implemented in various forms without departing from the spirit or essence of the disclosure, it should be understood that the above-mentioned embodiments are not limited to any of the foregoing details, but should be interpreted broadly within the spirit and scope defined by the appended claims. Therefore, all changes and modifications falling within the scope of the claims or their equivalents shall be covered by the appended claims.

What is claimed is:

1. A chuck assembly of a soft light box, comprising:
  a chuck, comprising a carrying ring and a sleeve, wherein the carrying ring is arranged on an outer side of the sleeve and is used to carry a plurality of umbrella ribs hingedly connected to the carrying ring; and
  a rotating plate, rotatably sleeved on the sleeve, wherein the rotating plate rotates in a circumferential direction of the sleeve and moves up and down along an axial direction of the sleeve;
  wherein the rotating plate presses hinged ends of the umbrella ribs through up and down motion, and the up and down motion of the rotating plate drives the umbrella ribs to swing relative to the carrying ring.

2. The chuck assembly of a soft light box of claim 1, wherein an outer side of the sleeve and an inner side of the rotating plate are rotationally connected by a thread protrusion and a thread groove that engage with each other.

3. The chuck assembly of a soft light box of claim 1, further comprising a fixing press plate, wherein the fixing press plate is sleeved between the carrying ring and the rotating plate and rotatably arranged on the rotating plate which presses the fixing press plate to drive the fixing press plate to press the hinged ends of the umbrella ribs.

4. The chuck assembly of a soft light box of claim 3, wherein a limit structure is further provided between the rotating plate and the fixing press plate and fixedly arranged on the fixing press plate, and a side of the rotating plate facing the fixing press plate is provided with an avoiding groove for avoiding the limit structure; when the rotating plate rotates, the limit structure slides in the avoiding groove; when the limit structure moves to one end of the avoiding groove, the limit structure abuts against a side wall of the avoiding groove to limit a rotation of the rotating plate.

5. The chuck assembly of a soft light box of claim 4, wherein the avoiding groove is arc-shaped, and a radian of the avoiding groove corresponds to a rotation stroke of the rotating plate.

6. The chuck assembly of a soft light box of claim 5, wherein the radian of the avoiding groove is 60 degrees to 120 degrees.

7. The chuck assembly of a soft light box of claim 3, further comprising an resilient member, wherein the resilient member abuts between the fixing press plate and the carrying ring of the chuck, wherein the fixing press plate goes down to press the resilient member to compress, and when the resilient member returns to original shape, the fixing press plate restores to original position.

8. The chuck assembly of a soft light box of claim 7, wherein the carrying ring is provided with a protruding column, and the protruding column is provided with a screw hole, wherein a sink groove is protruding toward the protruding column at a relative position of the fixing press plate and the protruding column, wherein a bottom of the sink groove is provided with a through hole for the protruding column to pass through, wherein the protruding column stretches out and draws back along the through hole, and the protruding column and the sink groove are connected by a screw, wherein a nut of the screw is limited to the sink groove, and the resilient member is sleeved on an outer side of the protruding column and the sink groove.

9. The chuck assembly of a soft light box of claim 3, wherein the carrying ring is provided with a guide groove, the fixing press plate faces the carrying ring, a guide plate is provided at a position relative to the guide groove, and the guide plate slides out and back along the guide groove.

10. The chuck assembly of a soft light box of claim 9, wherein a plane where the guide plate is located is perpendicular to a plane where the fixing press plate is located.

11. The chuck assembly of a soft light box of claim 9, wherein a shape of the guide plate matches a shape of the guide groove.

12. The chuck assembly of a soft light box of claim 9, wherein the guide plate and the fixing press plate are an integral structure.

13. The chuck assembly of a soft light box of claim 9, wherein there are a plurality of guide plates, and the plurality of guide plates are evenly distributed on a side surface of the fixing press plate facing the carrying ring.

14. The chuck assembly of a soft light box of claim 1, further comprising a bayonet for connecting a camera, and the bayonet is detachably connected to a main body of the chuck.

15. The chuck assembly of a soft light box of claim 1, wherein an outer surface of the chuck and an outer surface of the rotating plate are respectively provided with an auxiliary hole.

16. A soft light box, comprising:
  umbrella ribs;
  a soft light cloth; and
  a chuck assembly comprising:
    a chuck, comprising a carrying ring and a sleeve, wherein the carrying ring is arranged on an outer side of the sleeve and is used to carry a plurality of umbrella ribs hingedly connected to the carrying ring; and
    a rotating plate, rotatably sleeved on the sleeve, wherein the rotating plate rotates in a circumferential direction of the sleeve and moves up and down along an axial direction of the sleeve;
    wherein the rotating plate presses hinged ends of the umbrella ribs through up and down motion, and the up and down motion of the rotating plate drives the umbrella ribs to swing relative to the carrying ring;
  wherein the soft light cloth is detachably arranged on the umbrella ribs, and one end of each the umbrella rib is hinged on the carrying ring.

17. The soft light box of claim 16, the chuck assembly further comprising a fixing press plate, wherein the fixing press plate is sleeved between the carrying ring and the rotating plate and rotatably arranged on the rotating plate which presses the fixing press plate to drive the fixing press plate to press the hinged ends of the umbrella ribs.

18. The soft light box of claim 17, wherein a limit structure is further provided between the rotating plate and the fixing press plate and fixedly arranged on the fixing press plate, and a side of the rotating plate facing the fixing press plate is provided with an avoiding groove for avoiding the limit structure; when the rotating plate rotates, the limit structure slides in the avoiding groove; when the limit structure moves to one end of the avoiding groove, the limit structure abuts against a side wall of the avoiding groove to limit a rotation of the rotating plate.

19. The soft light box of claim 17, the chuck assembly further comprising an resilient member, wherein the resilient member abuts between the fixing press plate and the carrying ring of the chuck, wherein the fixing press plate goes down to press the resilient member to compress, and when the resilient member returns to original shape, the fixing press plate restores to original position.

20. The soft light box of claim 17, wherein the carrying ring is provided with a guide groove, the fixing press plate faces the carrying ring, a guide plate is provided at a position relative to the guide groove, and the guide plate slides out and back along the guide groove.

\* \* \* \* \*